US010510297B2

(12) United States Patent
Jiang et al.

(10) Patent No.: US 10,510,297 B2
(45) Date of Patent: Dec. 17, 2019

(54) PIXEL CIRCUIT, DRIVING METHOD THEREOF, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Peng Jiang, Beijing (CN); Haipeng Yang, Beijing (CN); Ke Dai, Beijing (CN); Yong Jun Yoon, Beijing (KR)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 176 days.

(21) Appl. No.: 15/745,809

(22) PCT Filed: Jun. 29, 2017

(86) PCT No.: PCT/CN2017/090802
§ 371 (c)(1),
(2) Date: Jan. 18, 2018

(87) PCT Pub. No.: WO2018/120701
PCT Pub. Date: Jul. 5, 2018

(65) Prior Publication Data
US 2019/0347993 A1 Nov. 14, 2019

(30) Foreign Application Priority Data

Dec. 27, 2016 (CN) .......................... 2016 1 1229210

(51) Int. Cl.
*G09G 3/3258* (2016.01)

(52) U.S. Cl.
CPC ... *G09G 3/3258* (2013.01); *G09G 2320/0233* (2013.01)

(58) Field of Classification Search
CPC .. G09G 3/3233; G09G 3/3258; G09G 3/3266; G09G 2300/0809;
(Continued)

(56) References Cited

U.S. PATENT DOCUMENTS 9,029,849 B2 5/2015 Kim
9,336,713 B2 5/2016 Nam et al.
(Continued)

FOREIGN PATENT DOCUMENTS

CN 102654972 A 9/2012
CN 103680393 A 3/2014
(Continued)

OTHER PUBLICATIONS

Search Report for International Application No. PCT/CN2017/090802 dated Sep. 30, 2017.

*Primary Examiner* — Nelson M Rosario
(74) *Attorney, Agent, or Firm* — Calfee, Halter & Griswold LLP (57) ABSTRACT

The present disclosure relates to a pixel circuit including a charging circuit, a driving circuit, a compensating circuit, an adjusting circuit and a light emitting device. In a charging stage, a first node and a second node may be charged through the charging circuit. In a compensating stage, a threshold voltage compensation is applied to the third node through the compensating circuit. In an adjusting stage, a potential of the third node is adjusted by the adjusting circuit. In a light emitting stage, the driving circuit drives the light emitting device to emit light through the first power signal under control of the third node. Meanwhile, a threshold voltage (Continued)

compensation is applied to the third node which controls the driving circuit during the compensating stage.

15 Claims, 3 Drawing Sheets

(58) Field of Classification Search
CPC ... G09G 2300/0819; G09G 2300/0852; G09G 2310/0262; G09G 2310/0278; G09G 2320/043; G09G 3/3291; H01L 27/3244
See application file for complete search history.

(56) References Cited

U.S. PATENT DOCUMENTS

| | | |
|---|---|---|
| 9,595,227 B2 | 3/2017 | Yang et al. |
| 2008/0180364 A1* | 7/2008 | Kim .................... G09G 3/3233 345/76 |
| 2014/0062331 A1 | 3/2014 | Nam et al. |
| 2014/0326969 A1 | 11/2014 | Kim |
| 2016/0189604 A1* | 6/2016 | Hu ...................... G09G 3/3225 345/215 |
| 2016/0240139 A1 | 8/2016 | Yang et al. |
| 2018/0315376 A1* | 11/2018 | Chen .................... G09G 3/3258 |

FOREIGN PATENT DOCUMENTS

| | | |
|---|---|---|
| CN | 104021754 A | 9/2014 |
| CN | 104143313 A | 11/2014 |
| CN | 104157234 A | 11/2014 |
| CN | 106782331 A | 5/2017 |
| CN | 206301582 U | 7/2017 |
| EP | 2704131 A1 | 3/2014 |
| JP | 2005195756 A | 7/2005 |

\* cited by examiner

PIXEL CIRCUIT, DRIVING METHOD THEREOF, DISPLAY PANEL AND DISPLAY DEVICE

CROSS REFERENCE

The present application is based upon International Application No. PCT/CN2017/090802, filed on Jun. 29, 2017, which is based upon and claims priority to Chinese Patent Application No. 201611229210.3, filed on Dec. 27, 2016, and the entire contents thereof are incorporated herein by reference.

TECHNICAL FIELD

The present disclosure relates to the field of display technology, and more particularly, to a pixel circuit, a driving method thereof, a display panel and a display device.

BACKGROUND

With improvement of display technology, more and more Active Matrix Organic Light Emitting Diode (AMOLED) display panels are available on the market. Compared with the conventional Thin Film Transistor Liquid Crystal Display (TFT LCD), the AMOLED has advantages of low power consumption, low manufacturing cost, self-luminous, wide viewing angle and fast response, etc. At present, traditional LCD displays have been gradually replaced in display fields such as mobile phones, PDAs, digital cameras and the like. Unlike TFT LCDs which use a steady voltage to control the luminance, the AMOLED requires a steady current to control the light emission.

In an existing pixel circuit for driving the emission of the OLED, when a driving transistor drives the light emitting device OLED to emit light, a threshold voltage Vth of the driving transistor in each pixel circuit may be non-uniform due to following reasons: the luminance of the OLED being quite sensitive to variation of the driving current of the OLED, the driving transistor being not exactly the same in the manufacturing process, deviation of the process manufacture and aging of the device, and temperature changes during the operation, or the like. Therefore, a current of the OLED flowing through each pixel point may be different, which causes uneven display brightness and in turn affects the display effect of the whole image.

It should be noted that, information disclosed in the above background portion is provided only for better understanding of the background of the present disclosure, and thus it may contain information that does not form the prior art known by those ordinary skilled in the art.

SUMMARY

Embodiments of the present disclosure provide a pixel circuit, a driving method thereof, a display panel and a display device.

An embodiment of the present disclosure provides a pixel circuit, including: a charging circuit, a driving circuit, a compensating circuit, an adjusting circuit, and a light emitting device, wherein, a first control terminal of the charging circuit and a second control terminal of the charging circuit are configured to input a first control signal, a third control terminal of the charging circuit is configured to input a second control signal, a first input terminal of the charging circuit is configured to input a first power signal, a second input terminal of the charging circuit is configured to input a data signal, a first output terminal of the charging circuit is coupled to a first node and a second output terminal of the charging circuit is coupled to a second node;

a control terminal of the driving circuit is coupled to a third node, an input terminal of the driving circuit is configured to input the first power signal, and an output terminal of the driving circuit is coupled to an input terminal of the light emitting device;

a first control terminal of the compensating circuit is configured to input the first control signal, a second control terminal of the compensating circuit and a first input terminal of the compensating circuit are both coupled to the first node, a second input terminal of the compensating circuit is configured to input a second power signal, and an output terminal of the compensating circuit is coupled to the third node;

a control terminal of the adjusting circuit is configured to input the first control signal, an input terminal of the adjusting circuit is configured to input a reference voltage signal, a first output terminal of the adjusting circuit is coupled to the first node, a second output terminal of the adjusting circuit is coupled to the second node, and a third output terminal of the adjusting circuit is coupled to the third node;

an output terminal of the light emitting device is coupled to a third power signal; and in a charging stage, the charging circuit is configured to output the first power signal to the first node and output the data signal to the second node, under control of the first control signal and the second control signal; in a compensating stage, the compensating circuit is configured to apply a threshold voltage compensation to the third node by using the second power signal, under control of the first control signal and the first node; in an adjusting stage, the adjusting circuit is configured to adjust potentials of the first node, the second node and the third node through the reference voltage signal, under control of the first control signal; and in a light emitting stage, the driving circuit is configured to drive the light emitting device to emit light through the first power signal under control of the third node.

In one possible implementation, in the above pixel circuit provided by the embodiment of the present disclosure, the charging circuit includes: a first charging sub circuit and a second charging sub circuit, wherein, a first control terminal of the first charging sub circuit is configured to input the first control signal, a second control terminal of the first charging sub circuit is configured to input the second control signal, an input terminal of the first charging sub circuit is configured to input the first power signal, and an output terminal of the first charging sub circuit is coupled to the first node; and the first charging sub circuit is configured to output the first power signal to the first node under control of the first control signal and the second control signal; and a control terminal of the second charging sub circuit is configured to input the first control signal, an input terminal of the second charging sub circuit is configured to input the data signal, and an output terminal of the second charging sub circuit is coupled to the second node; and the second charging sub circuit is configured to output the data signal to the second node under control of the first control signal.

In one possible implementation, in the above pixel circuit provided by the embodiment of the present disclosure, the first charging sub circuit includes: a first switch transistor and a second switch transistor, wherein, a gate electrode of the first switch transistor is configured to input the first control signal, a source electrode of the first switch transistor is configured to input the first power signal, and a drain electrode of the first switch transistor is coupled to a source electrode of the second switch transistor; and a gate electrode of the second switch transistor is configured to input the second control signal, and a drain electrode of the second switch transistor is coupled to the first node.

In one possible implementation, in the above pixel circuit provided by the embodiment of the present disclosure, the second charging sub circuit includes: a third switch transistor, wherein, a gate electrode of the third switch transistor is configured to input the first control signal, a source electrode of the third switch transistor is configured to input the data signal, and a drain electrode of the third switch transistor is coupled to the second node.

In one possible implementation, in the above pixel circuit provided by the embodiment of the present disclosure, the driving circuit includes: a fourth switch transistor;

a gate electrode of the fourth switch transistor is coupled to the third node, a source electrode of the fourth switch transistor is configured to input the first power signal, and a drain electrode of the fourth switch transistor is coupled to an input terminal of the light emitting device.

In one possible implementation, in the above pixel circuit provided by the embodiment of the present disclosure, the compensating circuit includes: a fifth switch transistor and a sixth switch transistor, wherein, a gate electrode of the fifth switch transistor is coupled to the first node, a source electrode of the fifth switch transistor is configured to input the second power signal, and a drain electrode of the fifth switch transistor is coupled to the third node; and a gate electrode of the sixth switch transistor is configured to input the first control signal, a source electrode of the sixth switch transistor is coupled to the first node, and a drain electrode of the sixth switch transistor is coupled to the third node.

In one possible implementation, in the above pixel circuit provided by the embodiment of the present disclosure, the adjusting circuit includes: a seventh switch transistor, a first capacitor, and a second capacitor, wherein, a gate electrode of the seventh switch transistor is configured to input the first control signal, a source electrode of the seventh switch transistor is configured to input the reference voltage signal, and a drain electrode of the seventh switch transistor is respectively coupled to one end of the first capacitor and the second node;

the other end of the first capacitor is coupled to the first node; and the second capacitor is coupled between the second node and the third node.

An embodiment of the present disclosure provides a driving method of the above pixel circuits provided by the embodiments of the present disclosure, including:

in a charging stage, the charging circuit outputting the first power signal to the first node and outputting the data signal to the second node, under control of the first control signal and the second control signal;

in a compensating stage, the compensating circuit applying a threshold voltage compensation to the third node by using the second power signal, under control of the first control signal and the first node;

in an adjusting stage, the adjusting circuit adjusting potentials of the first node, the second node and the third node through the reference voltage signal, under control of the first control signal; and in a light emitting stage, the driving circuit driving the light emitting device to emit light through the first power signal under control of the third node.

An embodiment of the present disclosure provides a pixel circuit, including: a charging circuit, configured to output a data signal to a first node and a third node in response to a first control signal and a second control signal; a driving circuit, configured to output a driving voltage by using a first power signal in response to a signal level of the third node; a compensating circuit, configured to apply a threshold voltage compensation to the third node by using a second power signal in response to the first control signal and a potential of the first node; and a light emitting device, configured to emit light under driving of the driving voltage.

In one possible implementation, the above pixel circuit provided by the embodiment of the present disclosure further includes: an adjusting circuit, configured to adjust the potential of the first node and a potential of the third node by using a reference voltage in response to the first control signal.

In one possible implementation, in the above pixel circuit provided by the embodiment of the present disclosure, the compensating circuit includes: a fifth switch transistor, having a gate electrode coupled to the first node, a source electrode for inputting the second power signal, and a drain electrode coupled to the third node; and a sixth switch transistor, having a gate electrode for inputting the first control signal, a source electrode coupled to the first node, and a drain electrode coupled to the third node.

In one possible implementation, in the above pixel circuit provided by the embodiment of the present disclosure, the adjusting circuit includes: a seventh switch transistor, a first capacitor and a second capacitor, wherein a first end of the first capacitor is coupled to the first node, a second end of the first capacitor is coupled to a drain electrode of the seventh switch transistor, a gate electrode of the seventh switch transistor is configured to input the first control signal, a source electrode of the seventh switch transistor is configured to input a reference voltage input signal, and a drain electrode of the seventh switch transistor is coupled to the second end of the first capacitor and a second node, and a first end of the second capacitor is coupled to the third node, and a second end of the second capacitor is coupled to the second node.

An embodiment of the present disclosure provides a display panel including the above pixel circuits provided by the embodiments of the present disclosure.

An embodiment of the present disclosure provides a display device including the above display panels provided by the embodiments of the present disclosure.

It is to be understood that both the foregoing general description and the following detailed description are exemplary and explanatory only and are not restrictive of the present disclosure.

This section provides a summary of various implementations or examples of the technology described in the disclosure, and is not a comprehensive disclosure of the full scope or all features of the disclosed technology.

DETAILED DESCRIPTION

The specific embodiments of the pixel circuit, the driving method thereof, the display panel and the display device provided by the embodiments of the present disclosure are described in detail below with reference to the accompanying drawings.

Figure 1:
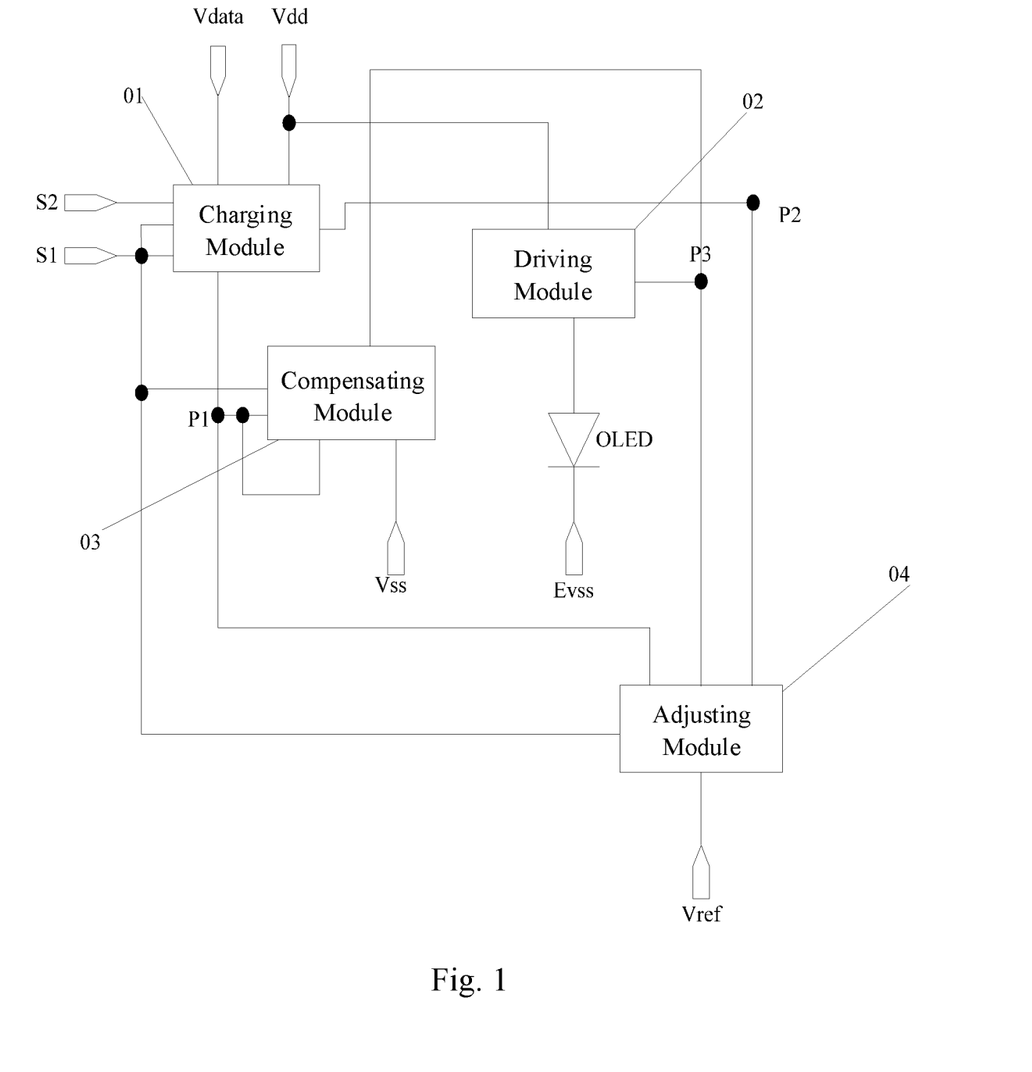
FIG. 1 is a schematic structural diagram of a pixel circuit provided by an embodiment of the present disclosure.

As shown in FIG. 1, the pixel circuit provided by the embodiment of the present disclosure may include: a charging module 01, a driving module 02, a compensating module 03, an adjusting module 04, and a light emitting device OLED.

In the embodiment, a first control terminal of the charging module 01 and a second control terminal of the charging module 01 are configured to input a first control signal S1, a third control terminal of the charging module 01 is configured to input a second control signal S2, a first input terminal of the charging module 01 is configured to input a first power signal Vdd, a second input terminal of the charging module 01 is configured to input a data signal Vdata, a first output terminal of the charging module 01 is coupled to a first node P1 and a second output terminal of the charging module 01 is coupled to a second node P2. A control terminal of the driving module 02 is coupled to a third node P3, an input terminal of the driving module 02 is configured to input the first power signal Vdd, and an output terminal of the driving module 02 is coupled to an input terminal of the light emitting device OLED. A first control terminal of the compensating module 03 is configured to input the first control signal S1, a second control terminal of the compensating module 03 and a first input terminal of the compensating module 03 are both coupled to the first node P1, a second input terminal of the compensating module 03 is configured to input a second power signal Vss, and an output terminal of the compensating module 03 is coupled to the third node P3. A control terminal of the adjusting module 04 is configured to input the first control signal S1, an input terminal of the adjusting module 04 is configured to input a reference voltage signal Vref, a first output terminal of the adjusting module 04 is coupled to the first node P1, a second output terminal of the adjusting module 04 is coupled to the second node P2, and a third output terminal of the adjusting module 04 is coupled to the third node P3. An output terminal of the light emitting device OLED is coupled to a third power signal EVss.

In a charging stage, the charging module 01 is configured to output the first power signal Vdd to the first node P1 and output the data signal Vdata to the second node P2, under control of the first control signal S1 and the second control signal S2. In a compensating stage, the compensating module 03 is configured to apply a threshold voltage compensation to the third node P3 by using the second power signal Vss, under control of the first control signal S1 and the first node P1. In an adjusting stage, the adjusting module 04 is configured to adjust potentials of the first node P1, the second node P2 and the third node P3 through the reference voltage signal Vref, under control of the first control signal S1. In a light emitting stage, the driving module 02 is configured to drive the light emitting device OLED to emit light through the first power signal Vdd under control of the third node P3.

The above pixel circuit provided by the embodiment of the present disclosure includes a charging module, a driving module, a compensating module, an adjusting module and a light emitting device. In a charging stage, a first node and a second node may be charged through the charging module. In a compensating stage, a threshold voltage compensation is applied to the third node through the compensating module. In an adjusting stage, a potential of the third node is adjusted by the adjusting module. In a light emitting stage, the driving module drives the light emitting device to emit light through the first power signal under control of the third node, thus realizing the function of driving the light emitting device to emit light normally. Meanwhile, a threshold voltage compensation is applied to the third node which controls the driving module during the compensating stage, thus avoiding the influence of change of the threshold voltage of the driving module on luminance of the light emitting device, improving uniformity of the luminance of the light emitting device, so as to ensure the quality of the display picture.

Figure 2:
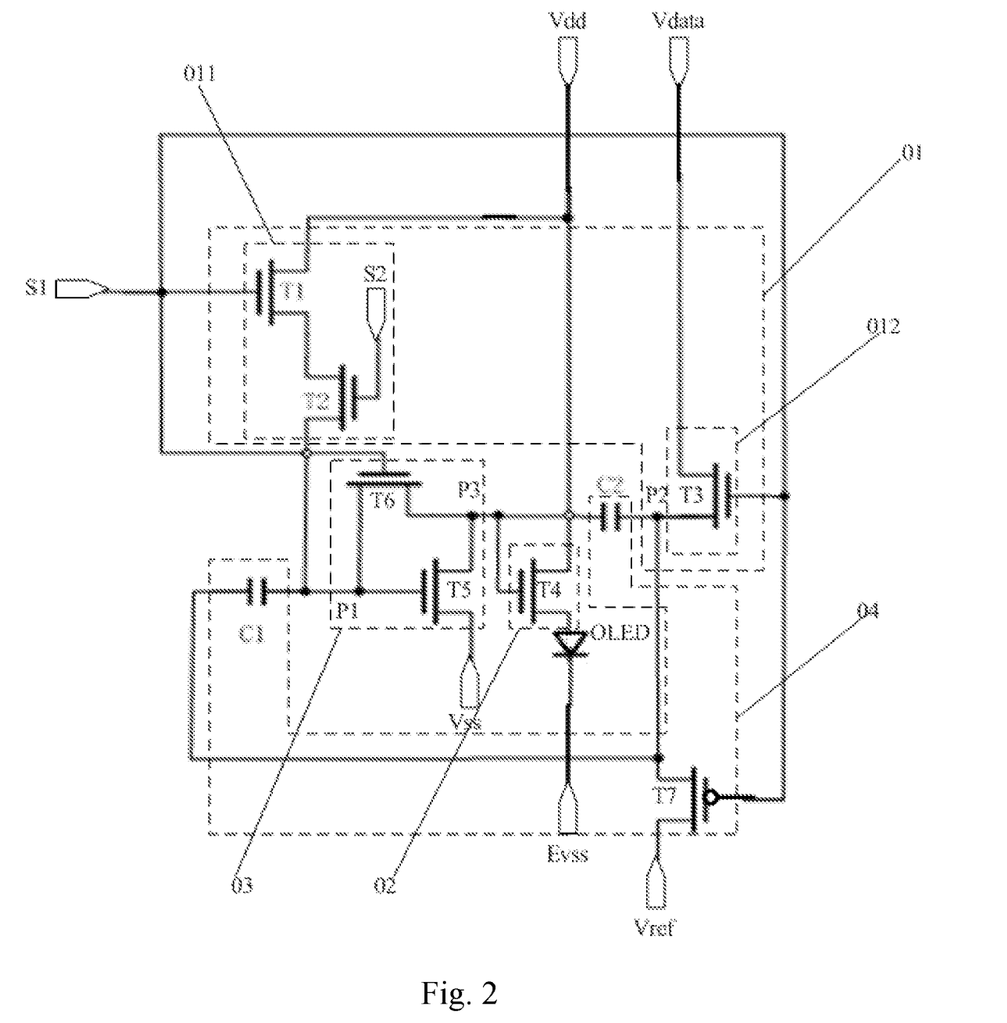
FIG. 2 is a schematic structural diagram of a pixel circuit provided by an embodiment of the present disclosure.

In a specific implementation, the "modules" or "units" of the present disclosure may be implemented as corresponding circuits or sub circuits. For example, as shown in FIG. 2, the charging module 01 is implemented as a charging circuit including several circuit elements such as the transistors T1, T2, T3 and the like. Other modules or units of the present disclosure may be implemented in a similar manner as shown in the example of FIG. 2. However, the present disclosure is not limited thereto.

In a specific implementation, in the above pixel circuit provided by the embodiment of the present disclosure, as shown in FIG. 2, the charging module 01 may include a first charging unit 011 and a second charging unit 012. In the embodiment, a first control terminal of the first charging unit 011 is configured to input the first control signal S1, a second control terminal of the first charging unit 011 is configured to input the second control signal S2, an input terminal of the first charging unit 011 is configured to input the first power signal Vdd, and an output terminal of the first charging unit 011 is coupled to the first node P1; and the first charging unit 011 is configured to output the first power signal Vdd to the first node P1 under control of the first control signal S1 and the second control signal S2. A control terminal of the second charging unit 012 is configured to input the first control signal S1, an input terminal of the second charging unit 012 is configured to input the data signal Vdata, and an output terminal of the second charging unit 012 is coupled to the second node P2; and the second charging unit 012 is configured to output the data signal Vdata to the second node P2 under control of the first control signal S1. Specifically, in the above pixel circuit provided by the embodiment of the present disclosure, the charging module may include: a first charging unit and a second charging unit. In this way, in the charging stage, the charging of the first node may be implemented by the first charging unit, and the charging of the second node may be implemented by the second charging unit.

In a specific implementation, in the above pixel circuit provided by the embodiment of the present disclosure, as shown in FIG. 2, the first charging unit 011 may include a first switch transistor T1 and a second switch transistor T2. In the embodiment, a gate electrode of the first switch transistor T1 is configured to input the first control signal S1, a source electrode of the first switch transistor T1 is configured to input the first power signal Vdd, and a drain electrode of the first switch transistor T1 is coupled to a source electrode of the second switch transistor T2. A gate electrode of the second switch transistor T2 is configured to input the second control signal S2, and a drain electrode of the second switch transistor T2 is coupled to the first node P1. Specifically, the first switch transistor may be turned on under the control of the first control signal, and the turned-on first switch transistor may output the first power signal to the source electrode of the second switch transistor. Then, the second switch transistor may be turned on under the control of the second control single, and the turned-on second switch transistor may output the first power signal of the source electrode to the first node under the control of the second control signal.

In a specific implementation, in the above pixel circuit provided by the embodiment of the present disclosure, as shown in FIG. 2, the second charging unit 012 may include: a third switch transistor T3. A gate electrode of the third switch transistor T3 is configured to input the first control signal S1, a source electrode of the third switch transistor T3 is configured to input the data signal Vdata, and a drain electrode of the third switch transistor T3 is coupled to the second node P2. Specifically, the third switch transistor may be turned on under the control of the first control signal, and the turned-on third switch transistor may output the data signal to the second node.

In a specific implementation, in the above pixel circuit provided by the embodiment of the present disclosure, as shown in FIG. 2, the driving module 02 may include: a fourth switch transistor T4. A gate electrode of the fourth switch transistor T4 is coupled to the third node P3, a source electrode of the fourth switch transistor T4 is configured to input the first power signal Vdd, and a drain electrode of the fourth switch transistor T4 is coupled to an input terminal of the light emitting device OLED. Specifically, the fourth switch transistor may be turned on under the control of the third node, and the turned-on fourth switch transistor may output the first power signal to the input terminal of the light emitting device to drive the light emitting device to emit light.

In a specific implementation, in the above pixel circuit provided by the embodiment of the present disclosure, as shown in FIG. 2, the compensating module 03 may include: a fifth switch transistor T5 and a sixth switch transistor T6. In the embodiment, a gate electrode of the fifth switch transistor T5 is coupled to the first node P1, a source electrode of the fifth switch transistor T5 is configured to input the second power signal Vss, and a drain electrode of the fifth switch transistor T5 is coupled to the third node P3. A gate electrode of the sixth switch transistor T6 is configured to input the first control signal S1, a source electrode of the sixth switch transistor T6 is coupled to the first node P1, and a drain electrode of the sixth switch transistor T6 is coupled to the third node P3. Specifically, the fifth switch transistor may be turned on under the control of the first node, and the sixth switch transistor may be turned on under the control of the first control signal. The turned-on fifth switch transistor and the turned-on sixth switch transistor form a discharging circuit to discharge the voltage of the third node to Vss+Vth, where Vth is a threshold voltage of the fourth switch transistor as the driving transistor.

In a specific implementation, in the above pixel circuit provided by the embodiment of the present disclosure, as shown in FIG. 2, the adjusting module 04 may include: a seventh switch transistor T7, a first capacitor C1, and a second capacitor C2. In the embodiment, a gate electrode of the seventh switch transistor T7 is configured to input the first control signal S1, a source electrode of the seventh switch transistor T7 is configured to input the reference voltage signal Vref, and a drain electrode of the seventh switch transistor T7 is respectively coupled to one end of the first capacitor C1 and the second node P2. The other end of the first capacitor C1 is coupled to the first node P1; and the second capacitor C2 is coupled between the second node P2 and the third node P3. Specifically, the seventh switch transistor may be turned on under the control of the first control signal, and the turned-on seventh switch transistor may output the reference voltage signal to one end of the first capacitor and the second node, and then adjust the potentials of the first node and the third node through the coupling effect of the first capacitor and the second capacitor.

It should be noted that the switch transistor and the driving transistor mentioned in the embodiments of the present disclosure may be Thin Film Transistors (TFTs) or Metal Oxide Semiconductors (MOSs), which is not limited herein. In a practical implementation, the source electrodes and drain electrodes of these transistors may be interchangeable, without specific distinction. The specific embodiment will be described by taking a thin film transistor as an example.

Figure 3:
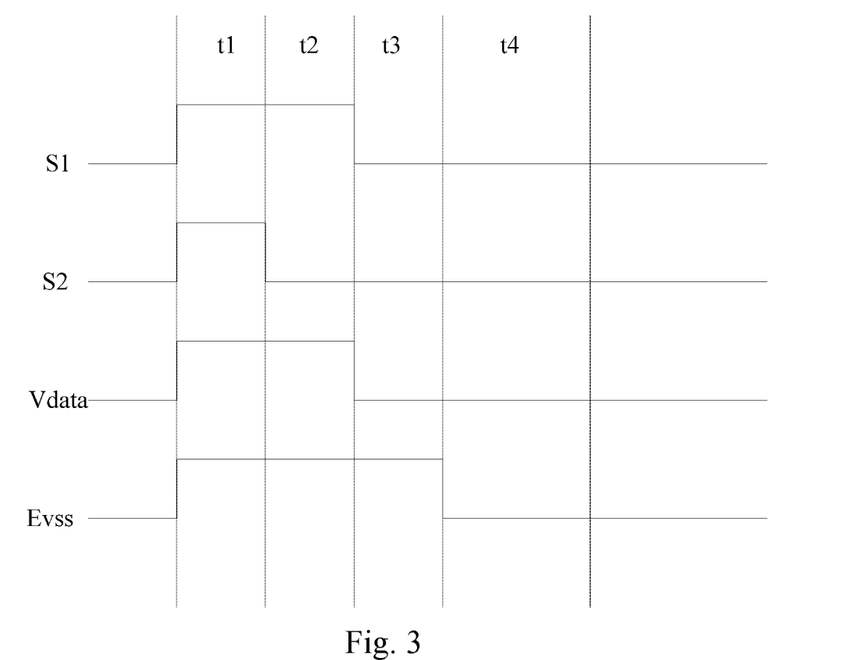
FIG. 3 is a working timing diagram of a pixel circuit provided by an embodiment of the present disclosure.

The operation process of the pixel circuit provided by the embodiment of the present disclosure will be described below in combination with the pixel circuit as shown in FIG. 2 and the input/output timing diagram of FIG. 2 as shown in FIG. 3. Specifically, four stages from t1 to t4 in the input/output timing diagram as shown in FIG. 3 are selected. Hereinafter, for example, 1 represents a high level signal, 0 represents a low level signal, the first to the sixth switch transistors are N type transistors and the seventh switch transistor is a P type transistor.

In the t1 stage, S1=1, S2=1, EVss=1, Vdd=1, Vss=0. Since S1=1 and S2=1, the first switch transistor T1, the second switch transistor T2, the third switch transistor T3 and the sixth switch transistor T6 are turned on. In the embodiment, the turned-on first switch transistor T1 and the turned-on second switch transistor T2 output the first power signal Vdd to the first node P1, so that the potential V1 of the first node P1 is Vdd. The turned-on third switch transistor T3 outputs the data signal Vdata to the second node P2, so that the potential V2 of the second node P2 is Vdata. The turned-on sixth switch transistor T6 turns on the first node P1 and the third node P3, so that the potential V3 of the third node P3 is Vdd. In this stage, EVss=1, so after the fourth switch transistor T4 is turned on, two ends of the light emitting device OLED are at high levels, the light emitting device OLED is short-circuited and does not emit light.

In the t2 stage, S1=1, S2=0, EVss=1, Vdd=1, Vss=0. Since S1=1, the first switch transistor T1, the third switch transistor T3 and the sixth switch transistor T6 remain on states. Since S2=0, the second switch transistor T2 is turned off. The turned-on first switch transistor T1 only outputs the first power signal Vdd to the source electrode of the second switch transistor T2, the turned-on third switch transistor T3 maintains the potential of the second node P2 as Vdata, and the first node P1 maintains the potential Vdd of the previous stage, so the fifth switch transistor T5 is turned on. The turned-on fifth switch transistor T5 and the turned-on sixth switch transistor T6 form a discharging circuit, and the voltage of the third node P3 is discharged to Vss+Vth, where Vth is the threshold voltage of the fourth switch transistor T4 as the driving transistor. In this stage, a voltage difference across the second capacitor C2 is V3−V2=Vss+Vth-Vdata. In addition, EVss remains a high level during this stage, and the light emitting device OLED does not emit light.

In the t3 stage, S1=0, S2=0, EVss=1, Vdd=1, Vss=0. Since S1=0, the seventh switch transistor T7 is turned on and the turned-on seventh switch transistor T7 outputs the reference voltage signal Vref to one end of the first capacitor C1 and the second node P2, respectively. Due to the coupling effect of the second capacitor C2, the potential V3 of the third node P3 in this stage is Vss+Vth−Vdata+Vref. In addition, EVss remains a high level during this stage, and the light emitting device OLED does not emit light.

In the t4 stage, S1=0, S2=0, EVss=0, Vdd=1, Vss=0. In this stage, EVss=0, the fourth switch transistor T4 enters the saturated on state under the control of the third node P3 and drives the light emitting device OLED to emit light through the first power signal Vdd. It can be known from the previous stage that the gate voltage of the fourth switch transistor T4 as the driving transistor is the voltage V3=Vss+Vth−Vdata+Vref of the third node. Therefore, the driving current for driving the light emitting device OLED to emit light is: $I=(W/2\ L)\ \mu_n C_{ox}\ (Vgs-Vth)^2 = C\ W/2\ L)\ \mu_n C_{ox}\ (Vss+Vth-Vdata+Vref-Vdd-Vth)^2 = C\ W/2\ L)\ \mu_n C_{ox}\ (Vss-Vdata+Vref-Vdd)^2$, wherein, Vgs is a voltage difference between the gate electrode and the source electrode of the fourth switch transistor T4, $\mu_n$ is the mobility of the fourth switch transistor T4, Cox is the intrinsic capacitance of the fourth switch transistor T4, and W/L is the aspect ratio of the fourth switch transistor T4. It can be seen that the driving current for driving the light emitting device 04 to emit light is independent of the threshold voltage of the fourth switch transistor T4, so that the influence of the threshold voltage variation of the fourth switch transistor T4 on the luminance of the light emitting device OLED is eliminated, and uniformity of the luminance of the light emitting device OLED is improved.

Based on the same concept, the embodiment of the present disclosure provides a driving method of the above pixel circuits provided in the embodiments of the present disclosure, which may include:

in a charging stage, the charging module outputting the first power signal to the first node and outputting the data signal to the second node, under control of the first control signal and the second control signal;

in a compensating stage, the compensating module applying a threshold voltage compensation to the third node by using the second power signal, under control of the first control signal and the first node;

in an adjusting stage, the adjusting module adjusting potentials of the first node, the second node and the third node through the reference voltage signal, under control of the first control signal; and in a light emitting stage, the driving module driving the light emitting device to emit light through the first power signal under control of the third node.

In the driving method of the above pixel circuits provided by the embodiments of the present disclosure, in the charging stage, charging of a first node and a second node may be implemented. In a compensating stage, a threshold voltage compensation may be applied to the third node. In an adjusting stage, adjustment of a potential of the third node may be implemented. In a light emitting stage, driving the light emitting device to emit light through the first power signal may be implemented. In this way, the function of the light emitting device to emit light normally is achieved. Meanwhile, a threshold voltage compensation is applied to the third node which controls the driving module during the compensating stage, thus avoiding the influence of change of the threshold voltage of the driving module on luminance of the light emitting device, improving uniformity of the luminance of the light emitting device, so as to ensure the quality of the display picture.

Based on the same concept, the embodiments of the present disclosure provide a display panel including the above pixel circuits provided by the embodiments of the present disclosure. The display panel may be any product or part having a display function, such as a mobile phone, a tablet computer, a television, a monitor, a notebook computer, a digital photo frame, a navigator and the like. Since the principle of the display panel to solve the problem is similar to that of the pixel circuit, the implementation of the display panel may refer to the implementation of the pixel circuit, and details are not described herein again.

Based on the same concept, the embodiments of the present disclosure provide a display device including the above display panels provided by the embodiments of the present disclosure. Since the principle of the display device to solve the problem is similar to that of the display panel, the implementation of the display device may refer to the implementation of the display panel, and details are not described herein again.

The embodiments of the present disclosure provide a pixel circuit, a driving method thereof, a display panel and a display device. The pixel circuit includes: a charging module, a driving module, a compensating module, an adjusting module, and a light emitting device, wherein, a first control terminal of the charging module and a second control terminal of the charging module are configured to input a first control signal, a third control terminal of the charging module is configured to input a second control signal, a first input terminal of the charging module is configured to input a first power signal, a second input terminal of the charging module is configured to input a data signal, a first output terminal of the charging module is coupled to a first node and a second output terminal of the charging module is coupled to a second node; a control terminal of the driving module is coupled to a third node, an input terminal of the driving module is configured to input the first power signal, and an output terminal of the driving module is coupled to an input terminal of the light emitting device; a first control terminal of the compensating module is configured to input the first control signal, a second control terminal of the compensating module and a first input terminal of the compensating module are both coupled to the first node, a second input terminal of the compensating module is configured to input a second power signal, and an output terminal of the compensating module is coupled to the third node; a control terminal of the adjusting module is configured to input the first control signal, an input terminal of the adjusting module is configured to input a reference voltage signal, a first output terminal of the adjusting module is coupled to the first node, a second output terminal of the adjusting module is coupled to the second node, and a third output terminal of the adjusting module is coupled to the third node; an output terminal of the light emitting device is coupled to a third power signal.

The above pixel circuit provided by the embodiment of the present disclosure includes a charging module, a driving module, a compensating module, an adjusting module and a light emitting device. In a charging stage, a first node and a second node may be charged through the charging module. In a compensating stage, a threshold voltage compensation is applied to the third node through the compensating module. In an adjusting stage, a potential of the third node is adjusted by the adjusting module. In a light emitting stage, the driving module drives the light emitting device to emit light through the first power signal under control of the third node, thus realizing the function of driving the light emitting device to emit light normally. Meanwhile, a threshold voltage compensation is applied to the third node which controls the driving module during the compensating stage, thus avoiding the influence of change of the threshold voltage of the driving module on luminance of the light emitting device, improving uniformity of the luminance of the light emitting device, so as to ensure the quality of the display picture.

The beneficial effects of the embodiments of the present disclosure include the following.

The embodiments of the present disclosure provide a pixel circuit, a driving method thereof, a display panel and a display device. The pixel circuit includes: a charging module, a driving module, a compensating module, an adjusting module, and a light emitting device, wherein, a first control terminal of the charging module and a second control terminal of the charging module are configured to input a first control signal, a third control terminal of the charging module is configured to input a second control signal, a first input terminal of the charging module is configured to input a first power signal, a second input terminal of the charging module is configured to input a data signal, a first output terminal of the charging module is coupled to a first node and a second output terminal of the charging module is coupled to a second node; a control terminal of the driving module is coupled to a third node, an input terminal of the driving module is configured to input the first power signal, and an output terminal of the driving module is coupled to an input terminal of the light emitting device; a first control terminal of the compensating module is configured to input the first control signal, a second control terminal of the compensating module and a first input terminal of the compensating module are both coupled to the first node, a second input terminal of the compensating module is configured to input a second power signal, and an output terminal of the compensating module is coupled to the third node; a control terminal of the adjusting module is configured to input the first control signal, an input terminal of the adjusting module is configured to input a reference voltage signal, a first output terminal of the adjusting module is coupled to the first node, a second output terminal of the adjusting module is coupled to the second node, and a third output terminal of the adjusting module is coupled to the third node; an output terminal of the light emitting device is coupled to a third power signal.

The above pixel circuit provided by the embodiment of the present disclosure includes a charging module, a driving module, a compensating module, an adjusting module and a light emitting device. In a charging stage, a first node and a second node may be charged through the charging module. In a compensating stage, a threshold voltage compensation is applied to the third node through the compensating module. In an adjusting stage, a potential of the third node is adjusted by the adjusting module. In a light emitting stage, the driving module drives the light emitting device to emit light through the first power signal under control of the third node, thus realizing the function of driving the light emitting device to emit light normally. Meanwhile, a threshold voltage compensation is applied to the third node which controls the driving module during the compensating stage, thus avoiding the influence of change of the threshold voltage of the driving module on luminance of the light emitting device, improving uniformity of the luminance of the light emitting device, so as to ensure the quality of the display picture.

Obviously, those skilled in the art may make various modifications and variations to the present disclosure without departing from the spirit and scope of the present disclosure. In this way, if these modifications and variations of the present disclosure belong to the scope of the claims of the present disclosure and the equivalent technologies, the present disclosure is also intended to include these modifications and variations.

What is claimed is:

1. A pixel circuit, comprising: a charging circuit, a driving circuit, a compensating circuit, an adjusting circuit, and a light emitting device, wherein,
    a first control terminal of the charging circuit and a second control terminal of the charging circuit are configured to input a first control signal, a third control terminal of the charging circuit is configured to input a second control signal, a first input terminal of the charging circuit is configured to input a first power signal, a second input terminal of the charging circuit is configured to input a data signal, a first output terminal of the charging circuit is coupled to a first node and a second output terminal of the charging circuit is coupled to a second node;
    a control terminal of the driving circuit is coupled to a third node, an input terminal of the driving circuit is configured to input the first power signal, and an output terminal of the driving circuit is coupled to an input terminal of the light emitting device;
    a first control terminal of the compensating circuit is configured to input the first control signal, a second control terminal of the compensating circuit and a first input terminal of the compensating circuit are both coupled to the first node, a second input terminal of the compensating circuit is configured to input a second power signal, and an output terminal of the compensating circuit is coupled to the third node;
    a control terminal of the adjusting circuit is configured to input the first control signal, an input terminal of the adjusting circuit is configured to input a reference voltage signal, a first output terminal of the adjusting circuit is coupled to the first node, a second output terminal of the adjusting circuit is coupled to the second node, and a third output terminal of the adjusting circuit is coupled to the third node;
    an output terminal of the light emitting device is coupled to a third power signal; and
    in a charging stage, the charging circuit is configured to output the first power signal to the first node and to output the data signal to the second node, under control of the first control signal and the second control signal; in a compensating stage, the compensating circuit is configured to apply a threshold voltage compensation to the third node by using the second power signal, under control of the first control signal and the first node; in an adjusting stage, the adjusting circuit is configured to adjust potentials of the first node, the second node and the third node through the reference voltage signal, under control of the first control signal; and in a light emitting stage, the driving circuit is configured to drive the light emitting device to emit light through the first power signal under control of the third node.

2. The pixel circuit according to claim 1, wherein the charging circuit comprises: a first charging sub circuit and a second charging sub circuit, wherein,
    a first control terminal of the first charging sub circuit is configured to input the first control signal, a second control terminal of the first charging sub circuit is configured to input the second control signal, an input terminal of the first charging sub circuit is configured to input the first power signal, and an output ten final of the first charging sub circuit is coupled to the first node; and the first charging sub circuit is configured to output the first power signal to the first node under control of the first control signal and the second control signal; and a control terminal of the second charging sub circuit is configured to input the first control signal, an input terminal of the second charging sub circuit is configured to input the data signal, and an output terminal of the second charging sub circuit is coupled to the second node; and the second charging sub circuit is configured to output the data signal to the second node under control of the first control signal.

3. The pixel circuit according to claim 2, wherein the first charging sub circuit comprises: a first switch transistor and a second switch transistor, wherein, a gate electrode of the first switch transistor is configured to input the first control signal, a source electrode of the first switch transistor is configured to input the first power signal, and a drain electrode of the first switch transistor is coupled to a source electrode of the second switch transistor; and a gate electrode of the second switch transistor is configured to input the second control signal, and a drain electrode of the second switch transistor is coupled to the first node.

4. The pixel circuit according to claim 2, wherein the second charging sub circuit comprises: a third switch transistor, wherein, a gate electrode of the third switch transistor is configured to input the first control signal, a source electrode of the third switch transistor is configured to input the data signal, and a drain electrode of the third switch transistor is coupled to the second node.

5. The pixel circuit according to claim 1, wherein the driving circuit comprises: a fourth switch transistor;

a gate electrode of the fourth switch transistor is coupled to the third node, a source electrode of the fourth switch transistor is configured to input the first power signal, and a drain electrode of the fourth switch transistor is coupled to an input terminal of the light emitting device.

6. The pixel circuit according to claim 1, wherein the compensating circuit comprises: a fifth switch transistor and a sixth switch transistor, wherein, a gate electrode of the fifth switch transistor is coupled to the first node, a source electrode of the fifth switch transistor is configured to input the second power signal, and a drain electrode of the fifth switch transistor is coupled to the third node; and a gate electrode of the sixth switch transistor is configured to input the first control signal, a source electrode of the sixth switch transistor is coupled to the first node, and a drain electrode of the sixth switch transistor is coupled to the third node.

7. The pixel circuit according to claim 1, wherein the adjusting circuit comprises: a seventh switch transistor, a first capacitor, and a second capacitor, wherein, a gate electrode of the seventh switch transistor is configured to input the first control signal, a source electrode of the seventh switch transistor is configured to input the reference voltage signal, and a drain electrode of the seventh switch transistor is respectively coupled to one end of the first capacitor and the second node;

the other end of the first capacitor is coupled to the first node; and the second capacitor is coupled between the second node and the third node.

8. A driving method of the pixel circuit according to claim 1, wherein in a charging stage, the charging circuit outputs the first power signal to the first node and outputs the data signal to the second node, under control of the first control signal and the second control signal;

in a compensating stage, the compensating circuit applies a threshold voltage compensation to the third node by using the second power signal, under control of the first control signal and the first node;

in an adjusting stage, the adjusting circuit adjusts potentials of the first node, the second node and the third node through the reference voltage signal, under control of the first control signal; and in a light emitting stage, the driving circuit drives the light emitting device to emit light through the first power signal under control of the third node.

9. A display panel, comprising the pixel circuit according to claim 1.

10. A display device, comprising the display panel according to claim 9.

11. A pixel circuit, comprising:

a charging circuit, configured to output a data signal to a first node and a third node in response to a first control signal and a second control signal;

a driving circuit, configured to output a driving voltage by using a first power signal in response to a signal level of the third node;

a compensating circuit, configured to apply a threshold voltage compensation to the third node by using a second power signal in response to the first control signal and a potential of the first node; and a light emitting device, configured to emit light under driving of the driving voltage, wherein the compensating circuit comprises:

a fifth switch transistor, having a gate electrode coupled to the first node, a source electrode for inputting the second power signal, and a drain electrode coupled to the third node; and a sixth switch transistor, having a gate electrode for inputting the first control signal, a source electrode coupled to the first node, and a drain electrode coupled to the third node.

12. The pixel circuit according to claim 11, further comprising:

an adjusting circuit, configured to adjust the potential of the first node and a potential of the third node by using a reference voltage in response to the first control signal.

13. The pixel circuit according to claim 12, wherein the adjusting circuit comprises: a seventh switch transistor, a first capacitor and a second capacitor, wherein a first end of the first capacitor is coupled to the first node, a second end of the first capacitor is coupled to a drain electrode of the seventh switch transistor, a gate electrode of the seventh switch transistor is configured to input the first control signal, a source electrode of the seventh switch transistor is configured to input a reference voltage input signal, and a drain electrode of the seventh switch transistor is coupled to the second end of the first capacitor and a second node, and a first end of the second capacitor is coupled to the third node, and a second end of the second capacitor is coupled to the second node.

14. A display panel, comprising the pixel circuit according to claim 11.

15. A display device, comprising the display panel according to claim 14.

* * * * *